(12) United States Patent
Shibata

(10) Patent No.: US 12,542,971 B2
(45) Date of Patent: Feb. 3, 2026

(54) IMAGE STABILIZATION CONTROL APPARATUS AND METHOD, AND STORAGE MEDIUM

(71) Applicant: CANON KABUSHIKI KAISHA, Tokyo (JP)

(72) Inventor: Nobuhiro Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 18/454,332

(22) Filed: Aug. 23, 2023

(65) Prior Publication Data

US 2024/0073527 A1 Feb. 29, 2024

(30) Foreign Application Priority Data

Aug. 30, 2022 (JP) .............................. 2022-137104

(51) Int. Cl.
*H04N 23/68* (2023.01)

(52) U.S. Cl.
CPC .............................. *H04N 23/687* (2023.01)

(58) Field of Classification Search
CPC ............. H04N 23/687; H04N 23/6811; G02B 27/646; G03B 5/06; G03B 2205/0015; G03B 2207/005

See application file for complete search history.

(56) References Cited

U.S. PATENT DOCUMENTS

| 2021/0105408 A1 | 4/2021 | Hirai |
| 2022/0256086 A1* | 8/2022 | Fujikawa ............... H04N 23/61 |
| 2024/0080562 A1* | 3/2024 | Jota .................... H04N 23/6812 |

FOREIGN PATENT DOCUMENTS

| EP | 3621287 A1 | 3/2020 |
| EP | 4181519 A1 | 5/2023 |
| JP | 6410431 B2 | 10/2018 |

OTHER PUBLICATIONS

The above documents were cited in a British Search Report issued on Feb. 9, 2024, that issued in the corresponding British Patent Application No. GB2312273.2.
Related U.S. Appl. No. 18/454,321, filed Aug. 23, 2023, Nobuhiro Shibata "Image Stabilization Control Apparatus and Method, and Storage Medium".

* cited by examiner

Primary Examiner — Christopher K Peterson
(74) Attorney, Agent, or Firm — Cowan, Liebowitz & Latman, P.C.

(57) ABSTRACT

An image stabilization control apparatus performs image stabilization by controlling a first correction unit that drives a correction lens included in an imaging optical system and a second correction unit that drives an image sensor, and by selecting one of a plurality of control methods including first and second control methods based on a focal length of the imaging optical system, and obtaining a correction amount of one of the first and second correction unit based on a shake amount from detection unit and on the control method selected by the selection unit. The first control method is to perform an over-correction using the first correction unit and an inverse-correction using the second correction unit.

18 Claims, 10 Drawing Sheets

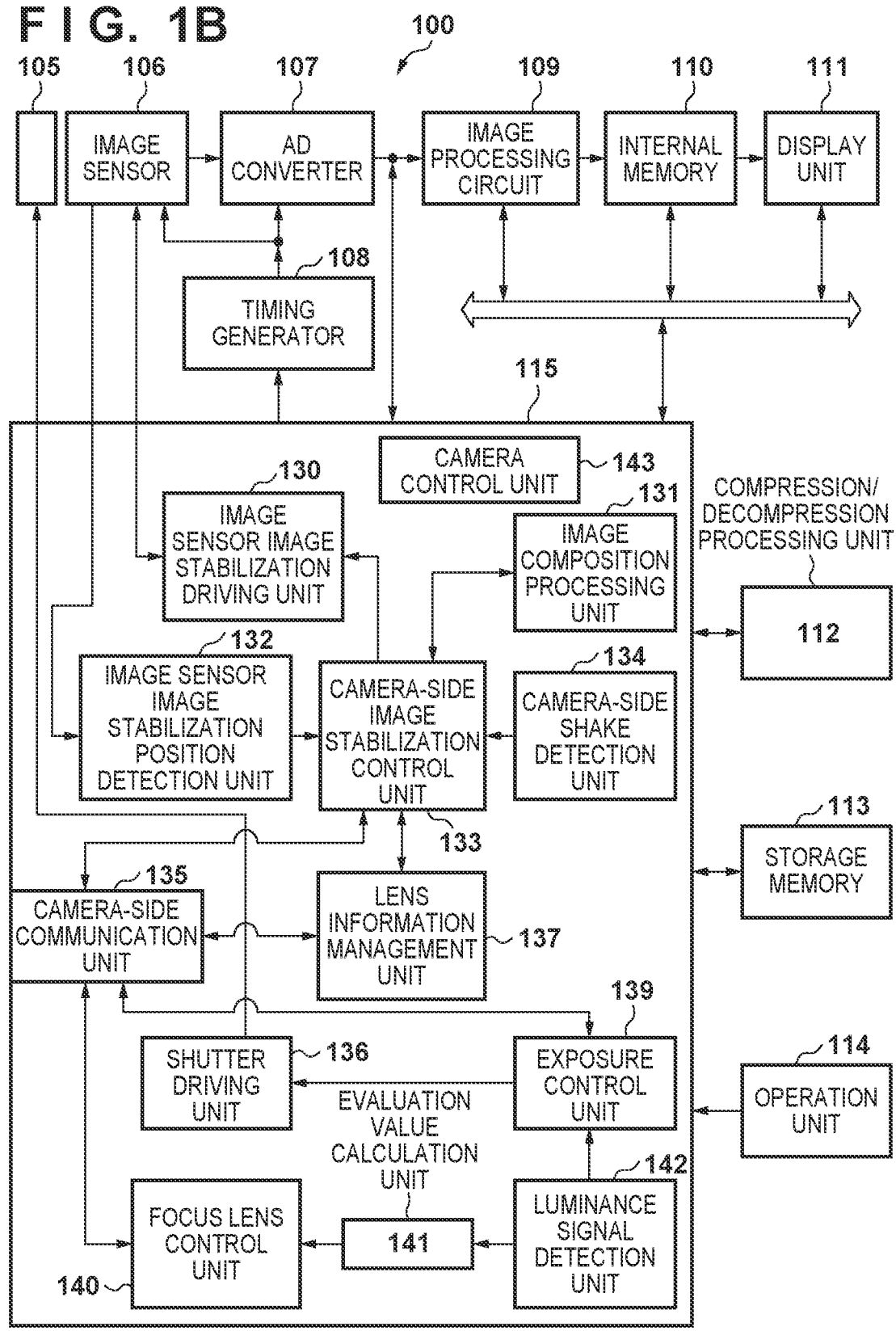

F I G. 3A

| | COORDINATED CONTROL METHOD 1 | PERIPHERY SHAKE CORRECTION METHOD | | |
| --- | --- | --- | --- | --- |
| | | | | |
| | | | A | B | C |
| RATIO | OIS : IBIS = CONSTANT | | OIS : IBIS = OVER-CORRECTION : INVERSE-CORRECTION | OIS : IBIS = TRANSITIONS | OIS : IBIS = CHANGES |
| FACTOR FOR DETERMINING RATIO | DETERMINED BASED ON "MAXIMUM MOVABLE RANGES OF OIS AND IBIS" | | DETERMINED BASED ON "MAXIMUM PERCENTAGE OF IOS", "MAXIMUM MOVABLE RANGE OF OIS", AND "RANGE IN WHICH OIS IS MOVED AT MAXIMUM PERCENTAGE" | | |
| EXAMPLES OF RATIOS | OIS:IBIS=50%:50% | | OIS:IBIS=200%:-100% | OIS:IBIS=200%:-100% → OIS:IBIS=100%:0% | OIS:IBIS= α%:β% |

FIG. 3B

| COORDINATED CONTROL METHOD 2 | | |
|---|---|---|
| | D | E |
| RATIO | OIS : IBIS = CONSTANT | OIS : IBIS = CHANGES |
| FACTOR FOR DETERMINING RATIO | DETERMINED BASED ON "RELATIONSHIP BETWEEN IMAGE QUALITY AND MOVABLE RANGE OF OIS" | |
| EXAMPLES OF RATIOS | OIS:IBIS=90%:10% | OIS:IBIS=α%:β% |

IMAGE STABILIZATION CONTROL APPARATUS AND METHOD, AND STORAGE MEDIUM

BACKGROUND OF THE INVENTION

Field of the Invention

The present invention relates to an image stabilization control apparatus and method, and storage medium.

Description of the Related Art

Recent image capturing apparatuses, such as still cameras and video cameras, typically have an image stabilization function. Especially, an optical image stabilization function comes in the following two types. One is a type that realizes an image stabilization operation mainly by moving a correction lens dedicated for image stabilization on a plane perpendicular to the optical axis (hereinafter referred to as "optical image stabilizer (OIS)"). The other is a type that realizes an image stabilization operation by moving an image sensor on a plane perpendicular to the image sensor (hereinafter referred to as "in-body image stabilizer (IBIS)").

Meanwhile, known directions of camera shake include pitch shake which is shake around a horizontal axis perpendicular to the optical axis, yaw shake which is shake around a vertical axis perpendicular to the optical axis, and roll shake which is shake around the optical axis, relative to a base orientation of an image capturing apparatus.

IBIS can not only correct pitch shake and yaw shake as it moves the image sensor on a plane perpendicular to the optical axis, but also correct roll shake as it can further move the image sensor in the rotation direction around the optical axis. On the other hand, OIS can correct pitch shake and yaw shake, but cannot correct roll shake even if the correction lens is rotated.

In view of this, by driving OIS and IBIS simultaneously (hereinafter referred to as "coordinated control"), an image stabilization range can be increased with respect to pitch shake and yaw shake compared to a case where only one of them is driven, and in addition, roll shake can be corrected as well.

In performing this coordinated control, a correction range can be increased to the maximum by appropriately setting the percentages of a shake correction amount based on OIS and a shake correction amount based on IBIS (see Japanese Patent No. 6410431).

However, it has been discovered that, as an optimal shake correction amount corresponding to camera shake changes with each image height, a shake correction remnant at a periphery of a screen is noticeable in some cases.

The method disclosed in Japanese Patent No. 6410431 gives no consideration to a measure against the aforementioned problem.

SUMMARY OF THE INVENTION

The present invention has been made in view of the aforementioned problem, and provides a control apparatus that can appropriately alleviate the influence of camera shake even in a case where a blur amount that occurs varies in accordance with an image height.

According to the present invention, provided is image stabilization control apparatus that performs image stabilization by controlling a first correction unit and a second correction unit, the first correction unit correcting camera shake by driving a correction lens included in an imaging optical system in a direction perpendicular to an optical axis, the second correction unit correcting camera shake by driving an image sensor in a direction perpendicular to the optical axis, the image sensor photoelectrically converting light incident via the imaging optical system and outputting an image signal, the image stabilization control apparatus comprising: an obtainment unit that obtains a shake amount from a detection unit; a selection unit that selects, based on a focal length of the imaging optical system, one of a plurality of control methods including a first control method and a second control method that control a ratio between the shake amount to be corrected by the first correction unit and the shake amount to be corrected by the second correction unit; and a calculation unit that obtains a correction amount of at least one of the first correction unit and the second correction unit based on the shake amount and on the control method selected by the selection unit, wherein the first control method is a method which performs an over-correction using the first correction unit in which a correction is made in excess of the shake amount within a range in which the first correction unit can be driven, and which also performs an inverse-correction using the second correction unit for cancelling out an amount that has been over-corrected.

Further, according to the present invention, provided is an image stabilization control method for performing image stabilization by controlling a first correction unit and a second correction unit, the first correction unit correcting camera shake by driving a correction lens included in an imaging optical system in a direction perpendicular to an optical axis, the second correction unit correcting camera shake by driving an image sensor in a direction perpendicular to the optical axis, the image sensor photoelectrically converting light incident via the imaging optical system and outputting an image signal, the image stabilization control method comprising: obtaining a shake amount from a detection unit; selecting, based on a focal length of the imaging optical system, one of a plurality of control methods including a first control method and a second control method that control a ratio between the shake amount to be corrected by the first correction unit and the shake amount to be corrected by the second correction unit; and obtaining a correction amount of at least one of the first correction unit and the second correction unit based on the shake amount and on the control method selected in the selecting, wherein the first control method is a method which performs an over-correction using the first correction unit in which a correction is made in excess of the shake amount within a range in which the first correction unit can be driven, and which also performs an inverse-correction using the second correction unit for cancelling out an amount that has been over-corrected.

Further, according to the present invention, provided is a non-transitory computer-readable storage medium, the storage medium storing a program that is executable by the computer, wherein the program includes program code for causing the computer to function as an image stabilization control apparatus that performs image stabilization by controlling a first correction unit and a second correction unit, the first correction unit correcting camera shake by driving a correction lens included in an imaging optical system in a direction perpendicular to an optical axis, the second correction unit correcting camera shake by driving an image sensor in a direction perpendicular to the optical axis, the image sensor photoelectrically converting light incident via the imaging optical system and outputting an image signal, the image stabilization control apparatus comprising: an obtainment unit that obtains a shake amount from a detection unit; a selection unit that selects, based on a focal length of the imaging optical system, one of a plurality of control methods including a first control method and a second control method that control a ratio between the shake amount to be corrected by the first correction unit and the shake amount to be corrected by the second correction unit; and a calculation unit that obtains a correction amount of at least one of the first correction unit and the second correction unit based on the shake amount and on the control method selected by the selection unit, wherein the first control method is a method which performs an over-correction using the first correction unit in which a correction is made in excess of the shake amount within a range in which the first correction unit can be driven, and which also performs an inverse-correction using the second correction unit for cancelling out an amount that has been over-corrected.

Further features of the present invention will become apparent from the following description of embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 1A and 1B are block diagrams showing a configuration of a digital camera according to an embodiment of the present invention.

FIGS. 3A and 3B are schematic diagrams for describing the features of each coordinated control method according to an embodiment.

DESCRIPTION OF THE EMBODIMENTS

Figure 1A:
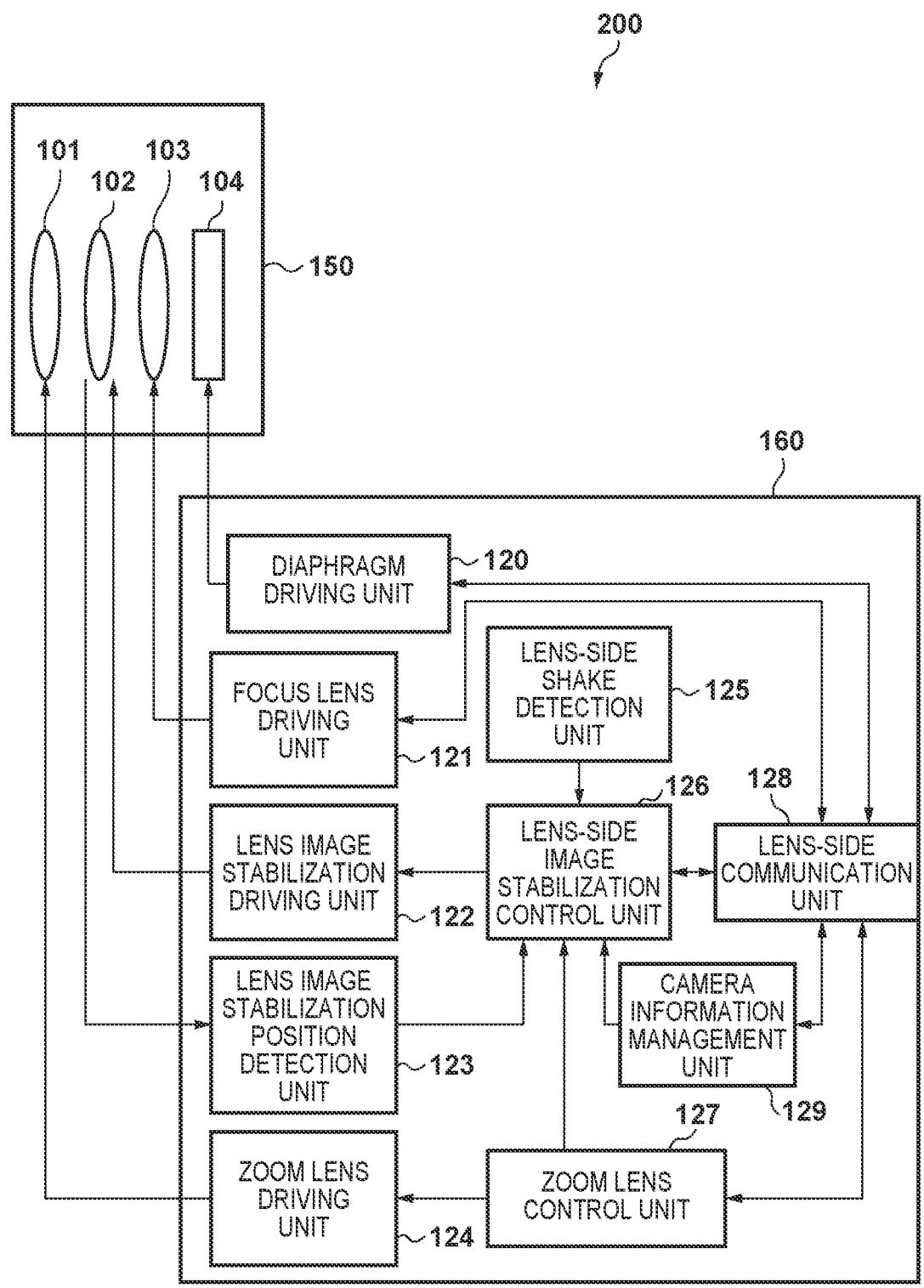

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIGS. 1A and 1B are block diagrams showing a configuration of a digital camera, which is an embodiment of an image capturing apparatus of the present invention; the digital camera is mainly composed of a camera main body 100 and a lens unit 200.

Although the present embodiment will be described in relation to a case where the present invention is implemented on an interchangeable lens digital camera, the present invention may be implemented on an electronic device with a camera function, which may be a camera such as a digital camera and a digital video camera, or may be a mobile telephone equipped with a camera, a computer equipped with a camera, a game device, and so forth. Furthermore, lenses may be configured integrally with the camera main body.

First, a configuration of the lens unit 200 will be described.

The lens unit 200 includes an imaging optical system 150 provided with a zoom lens 101, an image stabilization lens 102, a focus lens 103, and a diaphragm 104, and a lens-side control system 160 that controls the imaging optical system 150.

A movement of the zoom lens 101 in the optical axis direction optically changes the focal length of the imaging optical system 150, thereby altering the angle of view for shooting. The image stabilization lens 102 optically corrects camera shake caused by a shake of the image capturing apparatus by moving in a direction perpendicular to the optical axis. The focus lens 103 optically adjusts the in-focus position by moving in the optical axis direction. The diaphragm 104 is used to adjust the amount of light entering the camera main body 100.

In the lens-side control system 160, a zoom lens control unit 127 receives a zoom operation instruction from an operation unit 114 included in the camera main body 100 via a lens-side communication unit 128, and drives the zoom lens 101 via a zoom lens driving unit 124. As a result, the angle of view (focal length) of the lens unit 200 is altered.

A focus lens driving unit 121 drives the focus lens 103 based on a driving instruction for the focus lens 103 that has been received from the camera main body 100 via the lens-side communication unit 128.

A diaphragm driving unit 120 drives the diaphragm 104 based on an f-number that has been received from the camera main body 100 via the lens-side communication unit 128.

A lens-side shake detection unit 125 detects a shake of the lens unit 200, and outputs information related to the detected shake. A gyroscope is typically used as a sensor component that detects a shake; the gyroscope detects the angular velocity of the shake and outputs the same to a lens-side image stabilization control unit 126.

A lens image stabilization position detection unit 123 detects a position of the image stabilization lens 102 in a direction perpendicular to the optical axis, and outputs the detected position information to the lens-side image stabilization control unit 126.

A camera information management unit 129 holds and manages setting information of the camera main body 100, and information of the current position and the driving limit of an image sensor 106, on the lens unit 200 side.

The lens-side image stabilization control unit 126 obtains a shake correction amount and a correction direction for suppressing a shake based on a shake amount detected by the lens-side shake detection unit 125, the position information of the image stabilization lens 102 detected by the lens image stabilization position detection unit 123, and the information managed by the camera information management unit 129. Then, the lens-side image stabilization control unit 126 controls a lens image stabilization driving unit 122 based on the obtained shake correction amount and correction direction to drive the image stabilization lens 102 by the shake correction amount in the image shake correction direction.

Next, a configuration of the camera main body 100 will be described.

A shutter 105 is a mechanical focal-plane shutter, and includes a front curtain and a rear curtain. A shutter driving unit 136 drives the shutter 105. During shooting of moving images, the front curtain and the rear curtain are in a state where they are fixed at a position that is outside the optical path (an exposure position), allow passage of light entering via the lens unit 200, thereby causing an image of the light to be formed on the image sensor 106.

Furthermore, during shooting of a still image, while the rear curtain is in a state where it is held at the exposure position, the front curtain makes an exposure movement whereby it moves from a light-blocking position on the optical path to the exposure position, thereby allowing passage of light. Then, after a preset exposure period (shutter speed) has elapsed since the movement of the front curtain, the rear curtain makes a light-blocking movement whereby it moves from the exposure position to the light-blocking position; consequently, an exposure operation associated with single shooting is completed. An exposure operation for adjusting an exposure period with use of the aforementioned front curtain and rear curtain of the shutter 105 is known as a so-called "mechanical shutter method".

Further, a so-called "electronic front curtain shutter method" that controls an exposure period based on a combination of electrical reset scanning of the image sensor 106 (the electronic front curtain) and a movement of the rear curtain of the shutter 105 is also known.

Light that has passed through the imaging optical system 150 and the shutter 105 is received by the image sensor 106 that uses, for example, a charge-coupled device (CCD) or a complementary metal-oxide-semiconductor (CMOS) sensor, and photoelectrically converted into electrical signals. Note that the image sensor 106 of the present embodiment has a function of optically correcting camera shake by moving in a direction perpendicular to the optical axis.

An AD converter 107 generates image data by executing noise reduction processing, gain adjustment processing, and AD conversion processing with respect to the electrical signals (image signals) that have been read out from the image sensor 106. In accordance with a command from a camera control unit 143, a timing generator 108 controls driving timings of the image sensor 106 and driving timings of the AD converter 107. An image processing circuit 109 executes pixel interpolation processing, color conversion processing, and the like with respect to the image data output from the AD converter 107, and then transmits the processed image data to an internal memory 110.

A display unit 111 displays image data, shooting information, and the like held in the internal memory 110.

A compression/decompression processing unit 112 executes compression processing with respect to the image data stored in the internal memory 110 in accordance with an image format, and stores the resultant image data into a storage memory 113. Furthermore, it reads out the compressed image data from the storage memory 113, executes decompression processing, and stores the result thereof into the internal memory 110. The storage memory 113 stores various types of data, such as parameters, in addition to the image data.

The operation unit 114 is a user interface for a user to issue various types of instructions including a zoom operation instruction and a shooting instruction, and to perform various types of menu operations and a mode switching operation.

In a camera-side control system 115, the camera control unit 143 is composed of a calculation apparatus, such as a central processing unit (CPU), and controls the entirety of the image capturing apparatus by executing various types of control programs stored in the internal memory 110 in accordance with a user operation performed via the operation unit 114. The control programs include, for example, programs for performing zoom control, image stabilization control, automatic exposure control, automatic focus adjustment control, processing for detecting a face of a subject, and so forth. In the case of an interchangeable lens camera, a camera-side communication unit 135 and the lens-side communication unit 128 perform control related to information communication between the camera main body 100 and the lens unit 200.

A luminance signal detection unit 142 detects the luminance of the subject and the entire image from the image data output from the AD converter 107.

An exposure control unit 139 calculates exposure values (an f-number and an exposure period) based on luminance information obtained by the luminance signal detection unit 142, and outputs the f-number to the diaphragm driving unit 120 of the lens unit 200 via the camera-side communication unit 135, and the exposure period to the shutter driving unit 136. Furthermore, based on a user operation performed via the operation unit 114 or on the sensitivity that has been automatically set in accordance with the luminance, the exposure control unit 139 also concurrently performs control for the gain adjustment processing executed by the AD converter 107 with respect to image capturing signals that have been read out from the image sensor 106. Consequently, automatic exposure control (AE control) is performed.

An evaluation value calculation unit 141 extracts specific frequency components from the luminance information obtained by the luminance signal detection unit 142, and calculates contrast evaluation values based thereon. A focus lens control unit 140 issues a command for driving the focus lens 103 by a predetermined driving amount across a predetermined range, and also obtains the contrast evaluation values at the respective focus lens positions, which are the results of calculation performed by the evaluation value calculation unit 141. Then, it calculates a defocus amount according to a contrast AF method based on the focus lens position corresponding to the vertex of the transformation curve of the contrast evaluation values, and transmits the defocus amount to the focus lens driving unit 121 of the lens unit 200 via the camera-side communication unit 135. The focus lens driving unit 121 drives the focus lens 103 by the defocus amount; as a result, automatic focus control (AF control) for focusing a light beam on an image capturing surface of the image sensor 106 is performed. Note that although the contrast AF method has been described above, a phase-difference AF method may also be used. As the phase-difference AF method is known, a description thereof is omitted.

A camera-side shake detection unit 134 detects a shake of the camera main body 100, and outputs information related to the detected shake. Similarly to the lens-side shake detection unit 125, a gyroscope is typically used as a sensor component that detects vibration of a shake; the gyroscope detects the angular velocity of the shake and outputs the same to a camera-side image stabilization control unit 133.

An image sensor image stabilization position detection unit 132 detects a position of the image sensor 106 in a direction perpendicular to the optical axis, and outputs detected position information to the camera-side image stabilization control unit 133.

A lens information management unit 137 holds and manages optical characteristics information, as well as information related to the current position and the driving limit, of the image stabilization lens 102 on the camera main body 100 side.

The camera-side image stabilization control unit 133 obtains a shake correction amount and a correction direction for suppressing a shake based on the shake amount detected by the camera-side shake detection unit 134, the position information of the image sensor 106 detected by the image sensor image stabilization position detection unit 132, and the information managed by the lens information management unit 137. Then, based on the obtained shake correction amount and correction direction, the camera-side image stabilization control unit 133 controls an image sensor image stabilization driving unit 130 to drive the image sensor 106 by the shake correction amount in the image shake correction direction.

An image composition processing unit 131 converts the shake correction amount calculated by the camera-side image stabilization control unit 133 into an amount of image displacement between images by adding an appropriate coefficient thereto. A camera shake that appears between images can be corrected by appropriately controlling a scan range of an image to be shot next based on this amount of image displacement. Continuous execution of this operation achieves electronic image stabilization that suppresses image deterioration caused by a camera shake.

Figure 2:
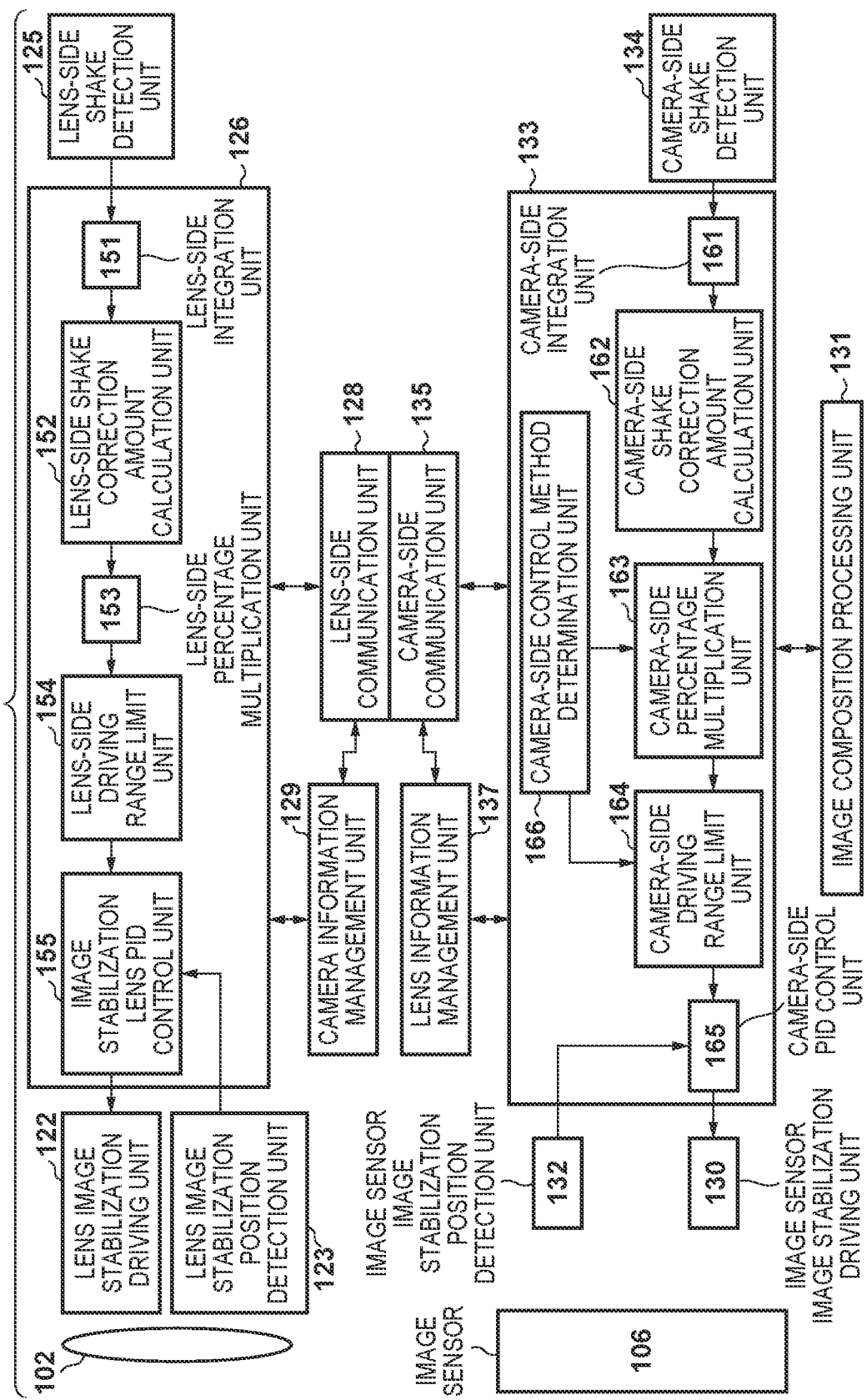
FIG. 2 is a block diagram showing a specific configuration of image stabilization system according to an embodiment.

FIG. 2 is a block diagram showing specific configurations of an image stabilization system (OIS) on the lens unit 200 side and an image stabilization system (IBIS) on the camera main body 100 side.

First, the image stabilization system (IBIS) on the camera main body 100 side will be described.

The angular velocity of a shake detected by the camera-side shake detection unit 134 is converted into a shake angle by undergoing integration processing executed by a camera-side integration unit 161 of the camera-side image stabilization control unit 133. A camera-side shake correction amount calculation unit 162 performs a calculation to obtain a shake correction amount with which the shake angle is cancelled out in consideration of the frequency band of the shake angle and the range in which the image sensor 106 can be driven.

A camera-side control method determination unit 166 makes a determination for selecting a coordinated control method based on IBIS and OIS (one of a periphery shake correction method, a coordinated control method 1, and a coordinated control method 2). Note that the details of each method and the details of processing executed by the camera-side control method determination unit 166 will be described later.

A camera-side percentage multiplication unit 163 multiplies the shake correction amount obtained by the camera-side shake correction amount calculation unit 162 by the percentage of the shake correction amount pertaining to IBIS based on the coordinated control method selected by the camera-side control method determination unit 166.

A camera-side driving range limit unit 164 places a limit on the shake correction amount in a case where a target position to which the image sensor 106 is to be driven by the shake correction amount exceeds the driving limit of the image sensor 106.

A camera-side PID control unit 165 performs feedback control using the current position of the image sensor 106 obtained by the image sensor image stabilization position detection unit 132 so as to track the target position to which the image sensor 106 is to be driven. Note that as PID control is a common technique, the details thereof are omitted. Furthermore, a feedback control method is not limited to PID control.

In addition, the camera-side image stabilization control unit 133 calculates an amount of image displacement between images, and instructs the image composition processing unit 131 to perform electronic image stabilization control.

Next, the image stabilization system (OIS) on the lens unit 200 side will be described.

The angular velocity of a shake detected by the lens-side shake detection unit 125 is converted into a shake angle by undergoing integration processing executed by a lens-side integration unit 151 of the lens-side image stabilization control unit 126. A lens-side shake correction amount calculation unit 152 performs a calculation to obtain a shake correction amount with which the shake angle is cancelled out in consideration of the frequency band of the shake angle and the range in which the image stabilization lens 102 can be driven.

A lens-side percentage multiplication unit 153 multiplies the shake correction amount obtained by the lens-side shake correction amount calculation unit 152 by the percentage of the shake correction amount pertaining to OIS based on the coordinated control method based on IBIS and OIS selected by the camera-side control method determination unit 166.

A lens-side driving range limit unit 154 places a limit on the shake correction amount in a case where a target position to which the image stabilization lens 102 is to be driven by the shake correction amount exceeds the driving limit of the image stabilization lens 102.

An image stabilization lens PID control unit 155 performs feedback control using the current position of the image stabilization lens 102 obtained by the lens image stabilization position detection unit 123 so as to track the target position to which the image stabilization lens 102 is to be driven. Note that as PID control is a common technique, the details thereof are omitted. Furthermore, a feedback control method is not limited to PID control.

With reference to FIGS. 3A and 3B, the following describes the types of aforementioned coordinated control that drives OIS and IBIS simultaneously, and the features of image stabilization under each type of coordinated control, according to the present embodiment. In each graph shown in FIGS. 3A and 3B, an X-axis represents a shake amount in the range in which correction can be performed based on OIS and IBIS, whereas a Y-axis represents a shake correction amount.

Among the three types of control methods shown in FIGS. 3A and 3B, the coordinated control methods 1 and 2 are methods that perform control so that the direction of relative movement of a subject image and the image sensor based on OIS matches the direction of relative movement of a subject image and the image sensor based on IBIS.

In the coordinated control methods 1 and 2, the percentages of the shake correction amounts that are respectively based on OIS and IBIS are percentages lower than 100%, and are calculated from the respective movable ranges of OIS and IBIS. That is to say, neither the correction amount based on OIS nor the correction amount based on IBIS exceeds the correction amount corresponding to the detected shake (the correction amount for correcting the detected shake).

On the other hand, in the periphery shake correction method, the percentage of the shake correction amount based on OIS is controlled to be in a state where it exceeds 100% (hereinafter referred to as "over-correction control"). Furthermore, the camera shake is corrected by controlling the percentage of the shake correction amount based on IBIS in a direction in which a part of the shake correction amount based on OIS that exceeds 100% is cancelled out, that is to say, to be in a state where it is negative (hereinafter referred to as "inverse-correction control"). That is to say, the correction amount based on OIS exceeds the correction amount corresponding to the detected shake, whereas the correction amount based on IBIS has a sign that is the inverse of the sign of the correction amount corresponding to the detected shake (driving direction is opposite). The details will be described below.

In image stabilization based on the coordinated control method 1, correction is performed by an amount equal to the shake amount, and thus the relationship between the shake amount and the shake correction amount is Y=X. With this taken into account, the ratio between the shake correction amount based on OIS and the shake correction amount based on IBIS is presented. In the coordinated control method 1, each shake correction amount increases, while the ratio between the shake correction amount based on OIS and the shake correction amount based on IBIS remains at a constant ratio, within the maximum movable range of the image stabilization lens 102 driven based on OIS. This constant ratio is determined from the ratio between the maximum movable range of the image stabilization lens 102 driven based on OIS and the maximum movable range of the image sensor 106 driven based on IBIS. For example, if the maximum movable ranges of the image stabilization lens 102 and the image sensor 106 are the same, the constant ratio is 50%. Note that the ratio between the maximum movable ranges does not denote the ratio between the distances over which the image stabilization lens 102 and the image sensor 106 can be actually driven, but denotes the ratio between the distances over which the relative movement of a subject image and the image surface of the image sensor can occur as a result of driving of the image stabilization lens 102 and the image sensor 106.

In shake correction according to the periphery shake correction method, over-correction control in which the shake correction amount based on OIS exceeds the shake amount is performed within the maximum movable range of the image stabilization lens 102 driven based on OIS. Meanwhile, inverse-correction control is performed in which the shake correction amount based on IBIS is a shake correction amount that cancels out an excess part of the shake correction amount based on OIS that exceeds the shake amount.

As stated earlier, an optimal shake correction amount corresponding to image shake changes with each image height. The change in the shake correction amount with each image height is steeper with IBIS, although it varies in extent depending on the lens characteristics. Therefore, when the aforementioned two types of image stabilization functions are driven simultaneously, making the percentage of the shake correction amount based on OIS higher than the percentage of the shake correction amount based on IBIS causes the change in the shake correction amount with each image height to be gradual, thereby making the shake correction remnant at the periphery of the screen less noticeable.

For this reason, in the periphery shake correction method, the shake correction remnant at the periphery of the screen is minimized by performing over-correction control with OIS, and performing inverse-correction control with IBIS. In the inverse-correction control, the image sensor is moved in the same direction as the direction in which the relative movement of a subject image and the image capturing surface of the image sensor occurs in association with the shake; therefore, the inverse-correction control is control that further increases the shake without the over-correction based on OIS.

Especially, provided that a section of the shake amount in which the image stabilization lens 102 is moved so that the shake correction amount based on OIS is at the maximum percentage is section A, and a remaining section within the maximum movable range of the image stabilization lens 102 is section B, section A is a section in which OIS and IBIS respectively perform the over-correction and the inverse-correction, whereas section B is a section in which an excess shake correction amount associated with this over-correction and the shake correction amount associated with the inverse-correction gradually decrease.

Furthermore, provided that a section of the shake amount outside the maximum movable range of the image stabilization lens 102 is section C, as it is not possible to perform further image stabilization based on OIS in section C, only the shake correction amount based on IBIS increases therein. Therefore, in section C, the ratio between the shake correction amount based on OIS and the shake correction amount based on IBIS fluctuates, rather than remaining constant.

In addition, in the periphery shake correction method, as the load of calculation of percentages is significantly high compared to the coordinated control method 1, the movable range of the image sensor 106 used with IBIS is limited in order to suppress this load of calculation. For this reason, in the periphery shake correction method, the image stabilization range in a case where OIS and IBIS are driven simultaneously is small compared to the coordinated control method 1. Therefore, in terms of the image stabilization performance, the coordinated control method 1 is more advantageous.

The problem of periphery shake correction method is that although the image stabilization performance is not greatly affected when the focal length is short (wide side) because the shake correction amount is small for camera shake of the same magnitude, but when the focal length is long (telephoto side), the required shake correction amount tends to be large and image stabilization performance will be degraded if a movable range is small. Therefore, in the present embodiment, image stabilization according to the characteristics of the image stabilization performance depending on the focal length is performed.

In the coordinated control method 2, which is the same as the coordinated control method 1 in terms of the basic concept, the percentage of the shake correction amount based on OIS is particularly high in consideration of the optical characteristics of the lens. This is because the shake correction remnant at the image periphery portion can be reduced by causing the shake correction amount based on OIS, which undergoes less change with each image height, to occupy a large part.

Provided that a section of the shake amount in which the shake correction amount based on OIS occupies a large part within the maximum movable range of the image stabilization lens 102 driven based on OIS is section D, as it is not possible to perform further image stabilization based on OIS in section E outside section D, only the shake correction amount based on IBIS increases therein. Therefore, in section E, the ratio between the shake correction amount based on OIS and the shake correction amount based on IBIS fluctuates, rather than remaining constant.

First Embodiment

A first embodiment of the present invention is now described.

Figure 4:
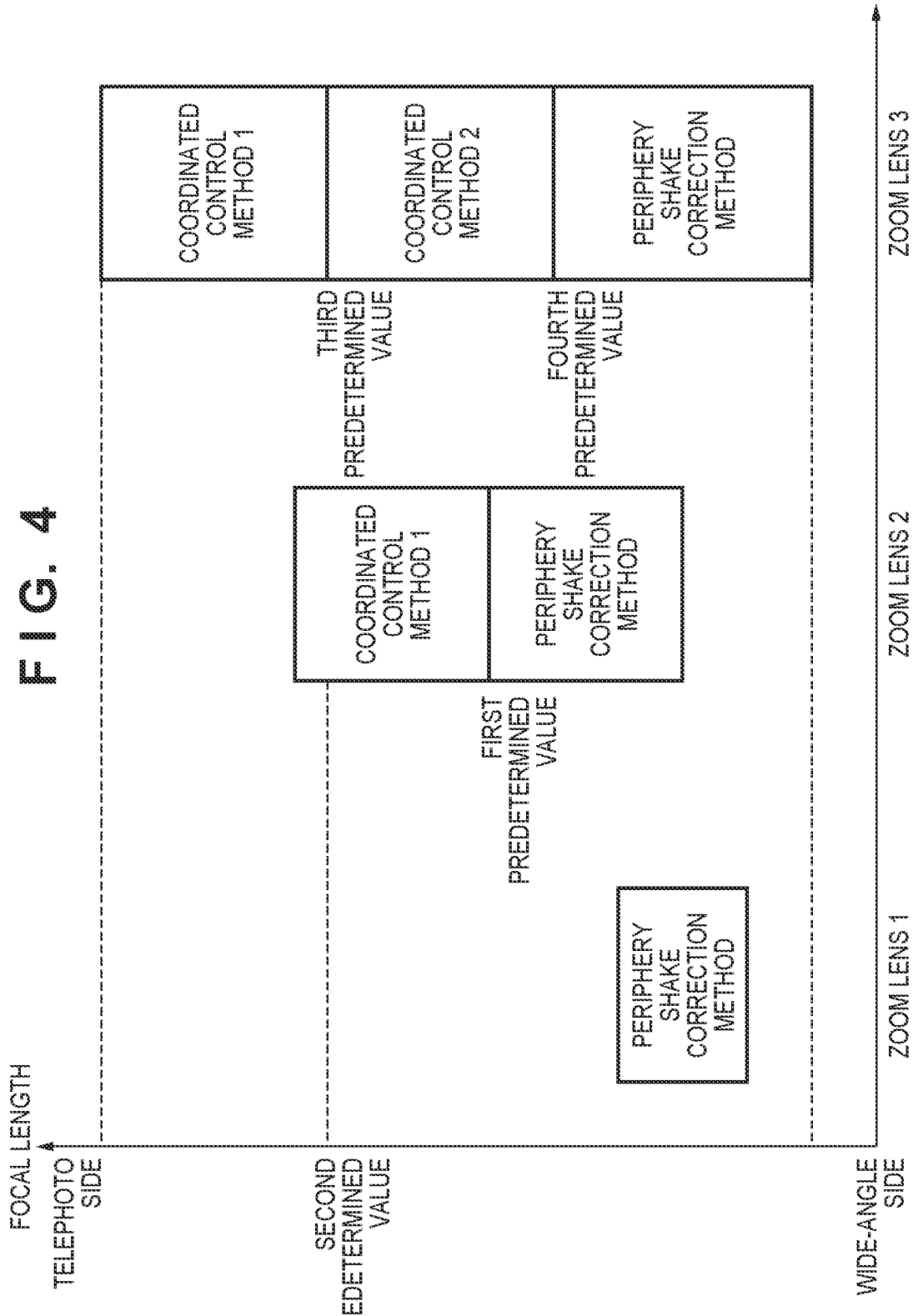
FIG. 4 is a schematic diagram for describing a relationship among the focal lengths of zoom lenses and the methods of coordinated control according to a first embodiment.

FIG. 4 is a schematic diagram for describing the focal length of the zoom lens and changing of control according to the first embodiment of the present invention; a vertical axis represents the focal length corresponding to the types of the zoom lens, and the focal length increases toward the upper side of the vertical axis.

A zoom lens 1 represents an example of a wide-angle zoom lens. In a case where the focal length is short, a shake correction amount is small, but the shake correction remnant at the periphery of the screen tends to be noticeable. Therefore, the periphery shake correction method is selected in the entire range of the focal length that can be changed by the zoom lens 1.

A zoom lens 2 represents an example of a medium-telephoto zoom lens whose focal length on the telephoto side is longer than a second predetermined value. In a case where the focal length is long, a shake correction amount is large, and therefore the image stabilization performance deteriorates if the movable range is small. However, when the focal length is long, the rate at which an optimal shake correction amount corresponding to camera shake changes with each image height is small compared to when the focal length is short, and thus the shake correction remnant at the periphery of the screen is not noticeable. In view of this, the coordinated control method 1 with a large image stabilization range is applied when the focal length is longer than a first predetermined value, and the periphery shake correction method is applied when the focal length is equal to or shorter than the first predetermined value. Note that the first predetermined value is a predetermined value at which the image stabilization performance and the shake correction remnant at the periphery of the screen are balanced.

A zoom lens 3 represents an example of a zoom lens with which the difference between the wide-angle end and the telephoto end is equal to or larger than a fifth predetermined value, that is to say, the range of the focal length is large. In this case, the periphery shake correction method is applied in a case where the current focal length is equal to or shorter than a fourth predetermined value, and the coordinated control method 1 with a large image stabilization range is applied in a case where the focal length is longer than a third predetermined value. Furthermore, in a case where the focal length is longer than the fourth predetermined value and equal to or shorter than the third predetermined value, the coordinated control method 2 that achieves a balance between the periphery shake correction method and the coordinated control method 1 is applied.

Figure 5A:
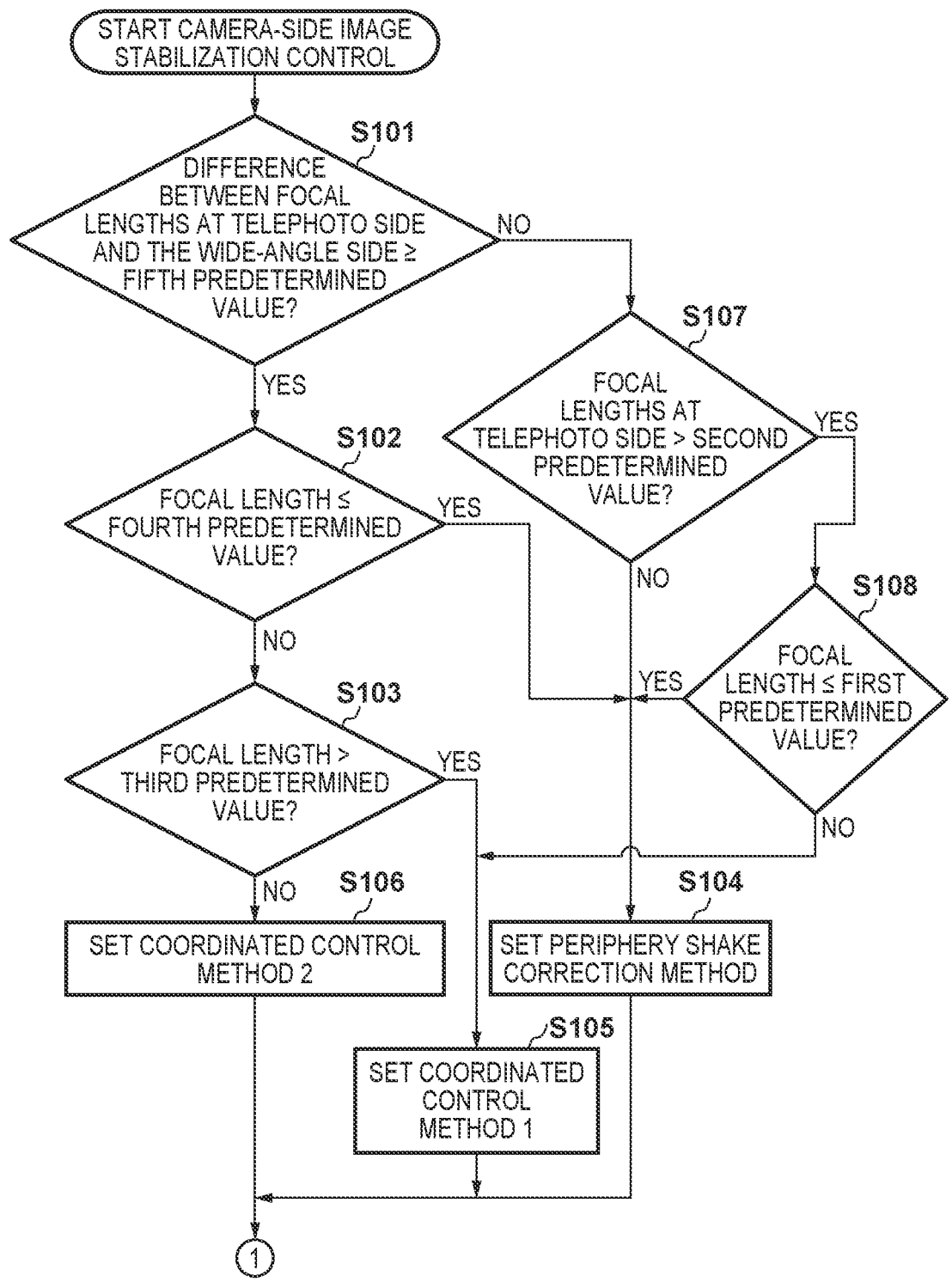
FIGS. 5A and 5B illustrate a flowchart of camera-side image stabilization control according to the first embodiment.
Figure 5B:
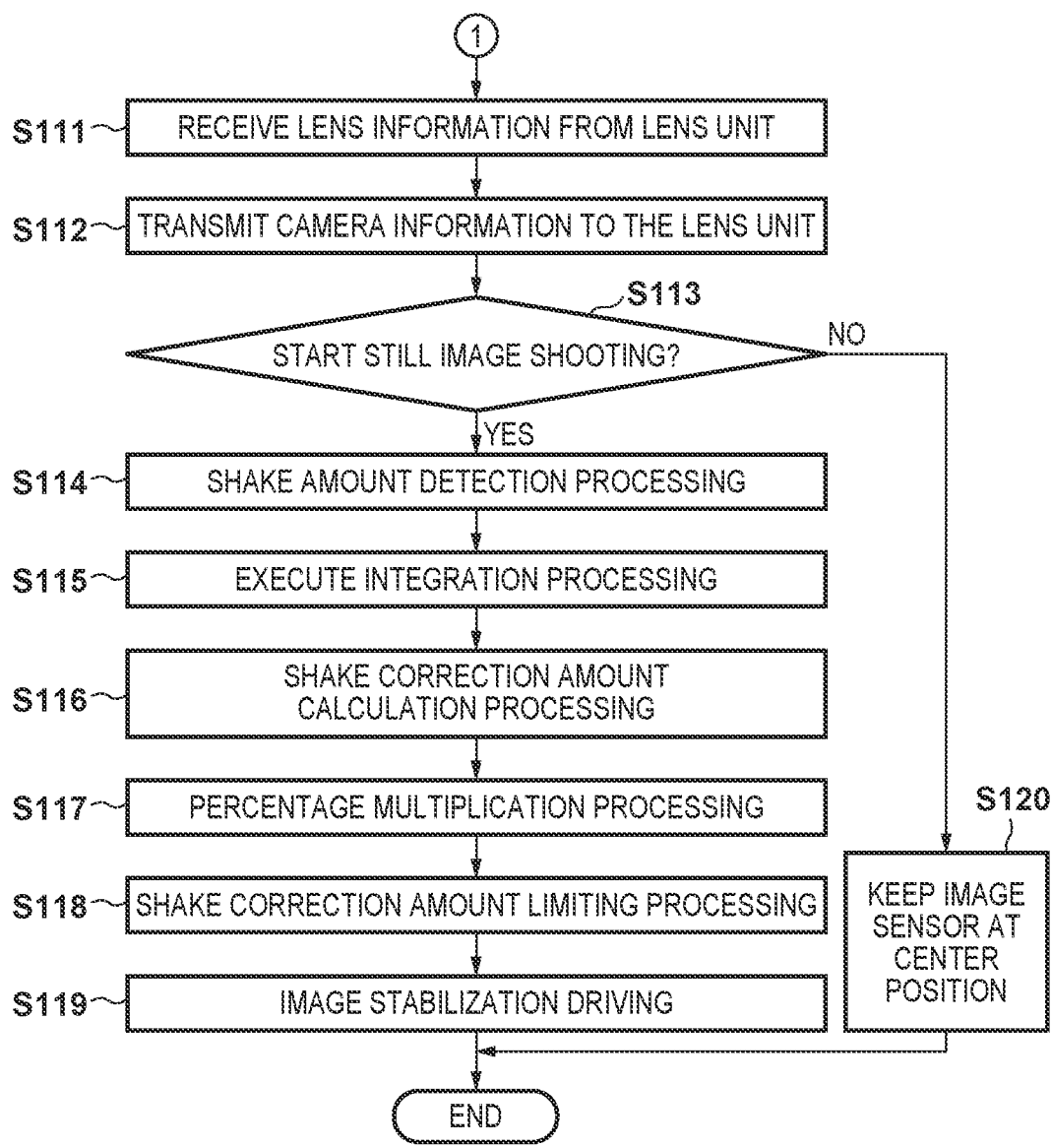
Figure 6:
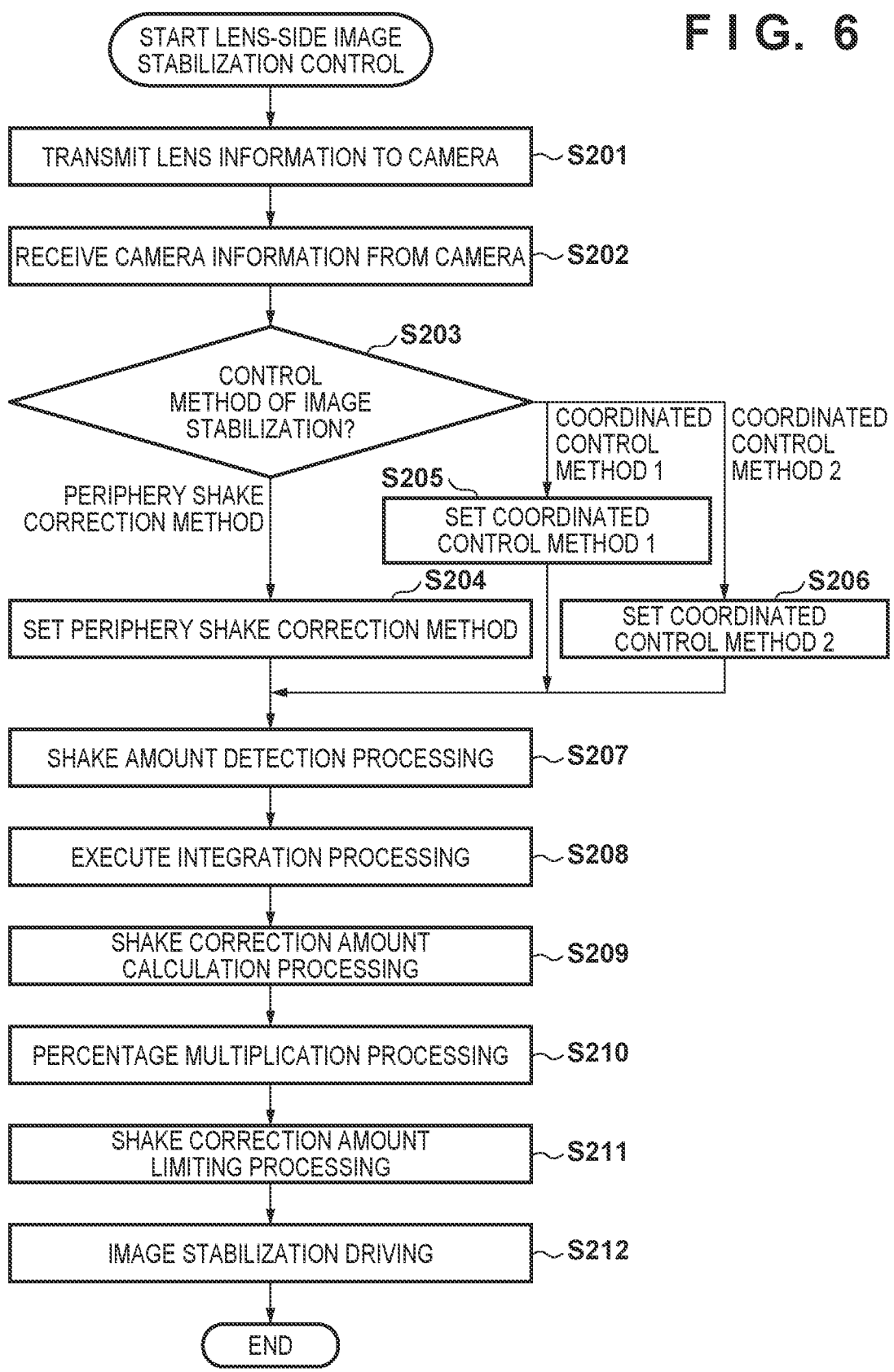
FIG. 6 is a flowchart of lens-side image stabilization control according to the first embodiment.

Next, a flow of the aforementioned control according to the present embodiment will be described with reference to flowcharts of FIGS. 5A and 5B and FIG. 6. FIGS. 5A and 5B illustrate a flowchart of camera-side image stabilization control according to the first embodiment, and FIG. 6 is a flowchart of lens-side image stabilization control according to the first embodiment. Control of FIGS. 5A and 5B and FIG. 6 is executed, for example, when the lens unit 200 is attached to the camera main body 100, or in accordance with a zoom operation performed on the operation unit 114 of the camera main body 100.

First, the camera-side image stabilization control will be described with reference to the flowchart of FIGS. 5A and 5B.

Once the camera-side image stabilization control has been started, in step S101, the camera-side control method determination unit 166 determines whether the difference between the focal length of the lens unit 200 on the telephoto side and the focal length thereof on the wide-angle side, which has been obtained via initialization communication when the lens unit 200 was attached to the camera main body 100, is equal to or larger than the fifth predetermined value. Here, for example, information related to the range of the focal length may be obtained from the lens unit 200, or information related to the range of the focal length that has been stored in advance in the internal memory 110 of the camera main body 100 may be obtained based on model information and the like of the lens unit 200.

In a case where the difference in the focal length is equal to or larger than the fifth predetermined value, processing proceeds to step S102, and whether the current focal length (hereinafter simply referred to as the "focal length") is equal to or shorter than the fourth predetermined value is determined. In a case where the focal length is equal to or shorter than the fourth predetermined value, that is to say, on the wide-angle side, processing proceeds to step S104, and the camera-side control method determination unit 166 sets the periphery shake correction method in order to prioritize alleviation of the shake correction remnant in relation to the image quality at the periphery. Consequently, the camera main body 100 starts a preparation for the inverse-correction based on IBIS.

In a case where the focal length is longer than the fourth predetermined value, whether the focal length is longer than the third predetermined value is determined in step S103. In a case where the focal length is long, that is to say, on the telephoto side, processing proceeds to step S105, and the camera-side control method determination unit 166 sets the coordinated control method 1 in order to prioritize the image stabilization performance.

In a case where the current focal length is equal to or shorter than the third predetermined value, that is to say, in a case where the focal length has an intermediate length, processing proceeds to step S106, and the camera-side control method determination unit 166 sets the coordinated control method 2, which is control that achieves a balance between the image stabilization performance and alleviation of a shake remnant in relation to the image quality at the periphery.

On the other hand, if it is determined that the difference between the focal length of the lens unit 200 on the telephoto side and the focal length thereof on the wide-angle side is smaller than the fifth predetermined value in step S101, processing proceeds to step S107, and whether the focal length of the lens unit 200 on the telephoto side is longer than the second predetermined value is determined. In a case where it is equal to or shorter than the second predetermined value, processing proceeds to step S104, and the camera-side control method determination unit 166 sets the periphery shake correction method. Consequently, the camera main body 100 starts a preparation for the inverse-correction based on IBIS.

On the other hand, in a case where the focal length of the lens unit 200 on the telephoto side is longer than the second predetermined value, processing proceeds to step S108, and whether the focal length is equal to or shorter than the first predetermined value is determined. In a case where the focal length is equal to or shorter than the first predetermined value, that is to say, on the wide-angle side, processing proceeds to step S104, and the camera-side control method determination unit 166 sets the periphery shake correction method in order to prioritize alleviation of the shake correction remnant in relation to the image quality at the periphery.

In a case where the focal length is longer than the first predetermined value, that is to say, on the telephoto side, processing proceeds to step S105, and the camera-side control method determination unit 166 sets the coordinated control method 1 in order to prioritize the image stabilization performance.

When one of the periphery shake correction method, the coordinated control method 1, and the coordinated control method 2 has been set as the control method for image stabilization through the above-described processing, lens information is received from the lens unit 200 in step S111. Here, the lens information includes the maximum movable range of the image stabilization lens 102 based on OIS, the maximum percentage of the shake correction amount based on OIS, the shake amount range in which the image stabilization lens 102 is moved at the maximum percentage, and the current position of the image stabilization lens 102. These are necessary in percentage calculation when the inverse-correction based on IBIS is performed.

In step S112, camera information, as well as the control method for image stabilization that has been set by the camera-side control method determination unit 166 through processing of steps S101 to S108, are transmitted to the lens unit 200. Here, the camera information includes the maximum movable range of the image sensor 106 based on IBIS, and the current position of the image sensor 106. These are necessary in percentage calculation when the lens unit 200 performs the over-correction based on OIS.

In step S113, whether to start still image shooting is determined. In a case where still image shooting is to be started, a shake amount is obtained from the camera-side shake detection unit 134 in step S114. At this time, a unit of the shake amount is an angular velocity. Then, in step S115, the camera-side integration unit 161 executes integration processing with respect to the shake amount, and converts the angular velocity into an angle (a shake angle)

In step S116, the camera-side shake correction amount calculation unit 162 obtains a correction amount with which the shake angle is cancelled out in consideration of the frequency band of the shake angle and the range in which the image sensor 106 can be driven. Then, in step S117, the camera-side percentage multiplication unit 163 multiplies the obtained correction amount by the percentage calculated based on the control method for image stabilization set by the camera-side control method determination unit 166. In the case of the periphery shake correction method, the percentage of IBIS has a negative value in a range in which the detected shake angle is smaller than a predetermined value (the ranges A and B in FIG. 3A), although it depends on the magnitude of the shake angle.

In step S118, in a case where the shake correction amount exceeds the range in which the image sensor 106 can be driven, the camera-side driving range limit unit 164 executes processing for limiting the shake correction amount in the range in which the image sensor 106 can be driven. Then, in step S119, the camera-side PID control unit 165 performs feedback control with respect to the image sensor 106.

On the other hand, in a case where still image shooting is not to be started in step S113, feedback control is performed so that the image sensor 106 is held at the center position in step S120.

Then, after the feedback control in step S119 or S120 has been ended, the camera-side image stabilization control is ended.

Next, the lens-side image stabilization control will be described with reference to the flowchart of FIG. 6.

First, lens information is transmitted to the camera main body 100 in step S201, and camera information, as well as the control method for image stabilization that has been set by the camera-side control method determination unit 166 through processing of the aforementioned steps S101 to S108, is received from the camera main body 100 in step S202.

Then, in step S203, in accordance with the obtained image stabilization control method, one of the periphery shake correction method, the coordinated control method 1, and the coordinated control method 2 is set in steps S204 to S206.

In step S207, the lens-side shake detection unit 125 obtains a shake amount. At this time, a unit of the shake amount is an angular velocity. Then, in step S208, the lens-side integration unit 151 executes integration processing with respect to the shake amount, and converts the angular velocity into an angle (a shake angle).

In step S209, the lens-side shake correction amount calculation unit 152 obtains a correction amount with which the shake angle is cancelled out in consideration of the frequency band of the shake angle and the range in which the camera can be driven. Then, in step S210, the lens-side percentage multiplication unit 153 multiplies the obtained correction amount by the percentage calculated based on the control method for image stabilization set in one of steps S204 to S206. In the case of the periphery shake correction method, the percentage of correction based on OIS exceeds 100% of the correction amount in a range in which the detected shake angle is smaller than the predetermined value (the ranges A and B in FIG. 3A), although it depends on the magnitude of the shake angle.

In step S211, in a case where the shake correction amount exceeds the range in which the image stabilization lens 102 can be driven, the lens-side driving range limit unit 154 executes processing for limiting the shake correction amount in the range in which the image stabilization lens 102 can be driven. Then, the image stabilization lens PID control unit 155 executes feedback control with respect to the image stabilization lens 102 in step S212, and the lens-side image stabilization control is ended.

Note that in order to make maximum use of IBIS, which tends to have a small movable range during coordinated control, at the time of exposure, OIS does not remain at the center position, except for a case where the photographer intentionally turns OFF the image stabilization function. Therefore, the lens-side image stabilization control does not include branching processing that depends on the start of still image shooting, like step S107 of FIG. 5A in the camera-side image stabilization control.

As described above, the first embodiment makes it possible to perform control that achieves a balance between the image stabilization performance and alleviation of the shake correction remnant at the periphery of the screen in accordance with the types of the zoom lens and their respective focal lengths.

Second Embodiment

Next, a second embodiment of the present invention will be described.

In the first embodiment, the control method for image stabilization is set in accordance with not only the current focal length, but also the range of the focal length that can be changed by the lens unit 200. In contrast, the second embodiment will be described in relation to a case where the control method for image stabilization is set in a simplified manner only in accordance with the current focal length.

Figure 7:
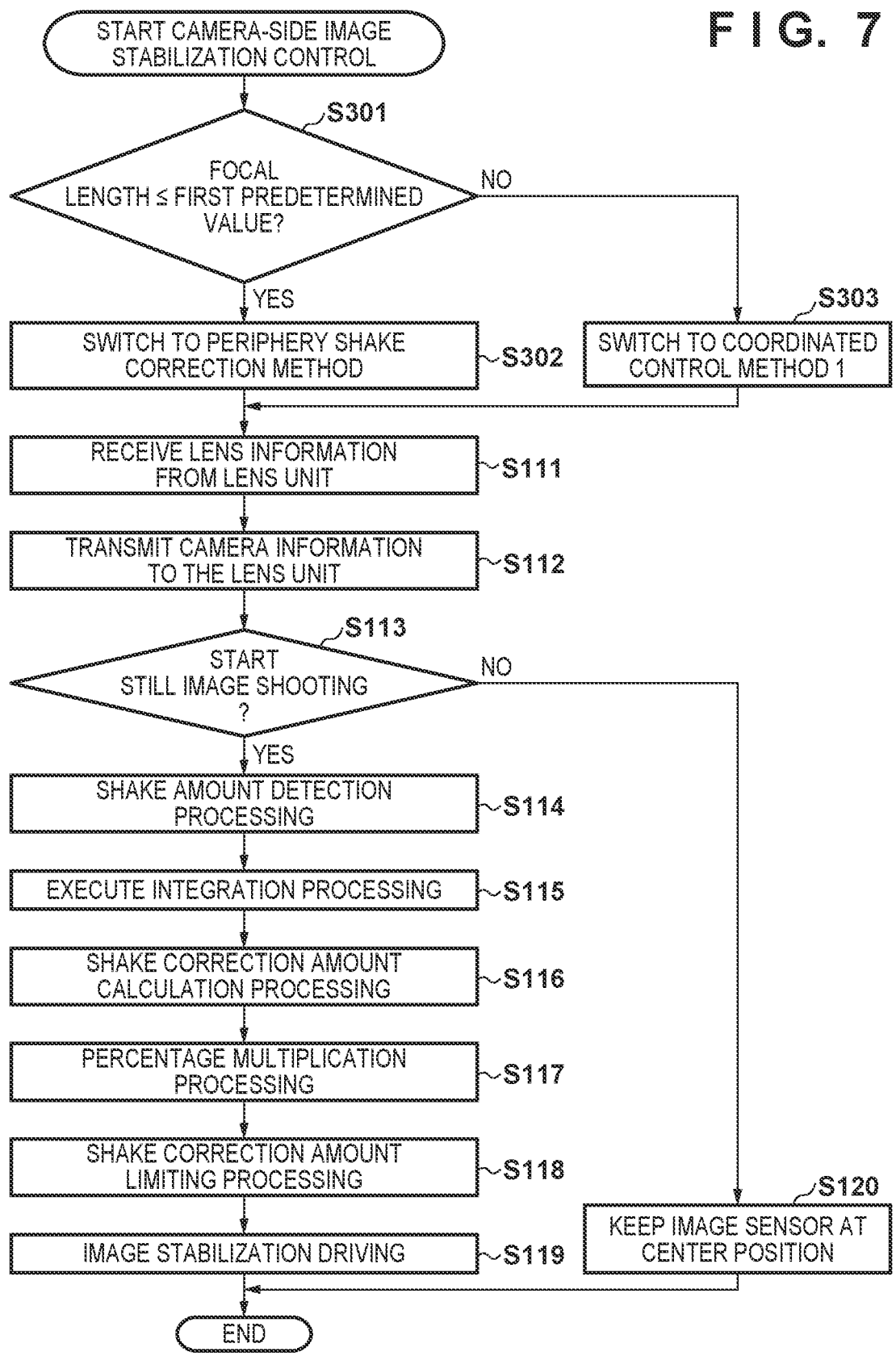
FIG. 7 is a flowchart of camera-side image stabilization control according to a second embodiment.

FIG. 7 is a flowchart of camera-side image stabilization control according to the second embodiment.

Once the camera-side image stabilization control has been started, whether the focal length of the lens unit 200 is equal to or shorter than a first predetermined value is determined in step S301. This first predetermined value may be, for example, the same as the first predetermined value shown in FIG. 4. In a case where the focal length is equal to or shorter than the first predetermined value, that is to say, on the wide-angle side, processing proceeds to step S302, and the camera-side control method determination unit 166 sets the periphery shake correction method in order to prioritize alleviation of the shake correction remnant in relation to the image quality at the periphery. Consequently, the camera main body 100 starts a preparation for the inverse-correction based on IBIS.

On the other hand, in a case where the focal length is longer than the first predetermined value, that is to say, on the telephoto side, processing proceeds to step S303, and the camera-side control method determination unit 166 sets the coordinated control method 1 in order to prioritize the image stabilization performance.

As processing of step S111 onward is similar to processing of step S111 onward in FIG. 5B, it is given the same step numerals thereas, and a description thereof is omitted.

With regard to the lens-side image stabilization control, control that is similar to control that has been described above with reference to the flowchart of FIG. 6 is performed. However, in step S202, the control method for image stabilization that has been set by the camera-side control method determination unit 166 through processing of the above-described steps S301 to S303, rather than processing of steps S101 to S108, is received.

As described above, according to the second embodiment, control that achieves a balance between the image stabilization performance and alleviation of the shake correction remnant at the periphery of the screen can be performed in a more simplified manner in accordance with the focal length.

Note that although the first and the second embodiments have been described above in relation to a case where the control method for image stabilization is set by the camera main body 100, the present invention is not limited to this, and the control method for image stabilization may be set by the lens unit 200. In this case, the lens unit 200 may be provided with a control method determination unit equivalent to the camera-side control method determination unit 166, execute processing of steps S101 to S108 in FIG. 5A, and notify the camera main body 100 of the set content. As a result, in a case where an operation member for the zoom lens is provided in the lens unit 200, it is possible to eliminate the need to notify the camera main body 100 of the focal length for the purpose of setting the control method for image stabilization. Also, each of the camera main body 100 and the lens unit 200 may determine the control method for image stabilization. In this case, it is not necessary to give notice of the set content.

Furthermore, the first and the second embodiments have been described above in relation to a case where each of the camera main body 100 and the lens unit 200 obtains the shake correction amounts that are respectively based on IBIS and OIS. However, one of the camera main body 100 and the lens unit 200 may obtain the shake correction amounts; in this case, a configuration in which IBIS and OIS are notified of the obtained shake correction amounts may be provided.

Furthermore, the first and the second embodiments have been described above in relation to a case where the three types of control methods are switched. However, similar advantageous effects can be achieved by switching between the periphery shake correction method, which performs over-correction control in which the shake correction amount based on OIS exceeds the correction amount corresponding to the detected shake and which makes a correction based on IBIS in a direction opposite to the direction of OIS, and the coordinated control method 1 or 2, in which the shake correction amount based on OIS is equal to or smaller than the correction amount corresponding to the detected shake and a correction is made with IBIS and OIS in the same direction, in accordance with the focal length. Note that making a correction in a direction opposite to the direction of OIS does not mean that the actual driving direction of the image sensor is opposite to the driving direction of the image stabilization lens 102, but means that the directions of relative movement of the image sensor and the subject image that occurs in association with driving are opposite.

Other Embodiments

Note that the present invention may be applied to a system composed of a plurality of devices, or may be applied to an apparatus made up of one device.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-137104, filed Aug. 30, 2022 which is hereby incorporated by reference herein in its entirety.

What is claimed is:

1. An image stabilization control apparatus that performs image stabilization by controlling a first driver and a second driver, the first driver correcting camera shake by driving a correction lens included in an imaging optical system in a direction perpendicular to an optical axis, the second driver correcting camera shake by driving an image sensor in a direction perpendicular to the optical axis, the image sensor photoelectrically converting light incident via the imaging optical system and outputting an image signal, the image stabilization control apparatus comprising one or more processors and/or circuitry which function as:
    an obtainment unit that obtains a shake amount from a detection unit;
    a selection unit that selects, based on a current focal length of the imaging optical system, one of a plurality of control methods including a first control method and a second control method that is different from the first control method; and
    a calculation unit that obtains a correction amount of at least one of the first driver and the second driver based on the shake amount and on the control method selected by the selection unit,
    wherein the first control method is a method which performs an over-correction using the first driver in which a correction is made in excess of the shake amount within a range in which the first driver can be driven, and which also performs an inverse-correction using the second driver.

2. The image stabilization control apparatus according to claim 1, wherein
    the selection unit selects the first control method in a case where the focal length is equal to or shorter than a preset first predetermined value, and selects the second control method in a case where the focal length is longer than the first predetermined value.

3. The image stabilization control apparatus according to claim 1, wherein
    the second control method is a method in which the first driver makes a correction in a range that does not exceed the shake amount.

4. The image stabilization control apparatus according to claim 3, wherein
    the second control method is a method that corrects the shake amount using a preset constant ratio for the first driver and the second driver across the range in which the shake amount can be corrected.

5. The image stabilization control apparatus according to claim 3, wherein
    the second control method is a method that causes the first driver to correct the shake amount in priority to the second driver.

6. The image stabilization control apparatus according to claim 1, wherein
    the plurality of control methods further include a third control method,
    the selection unit is configured to select one of the first control method, the second control method, and the third control method further in accordance with a range in which the imaging optical system can change the focal length, and
    the third control method is a method that causes the first driver to correct the shake amount in priority to the second driver.

7. The image stabilization control apparatus according to claim 6, wherein
    the selection unit is configured to select the first control method or the second control method in a case where the range in which the focal length can be changed is narrower than a preset second predetermined value.

8. The image stabilization control apparatus according to claim 7, wherein
    the selection unit is further configured to select the first control method or the second control method based on the focal length in a case where the range in which the focal length can be changed includes a focal length longer than a preset third predetermined value, and select the first control method in a case where the range in which the focal length can be changed does not include a focal length longer than the third predetermined value.

9. The image stabilization control apparatus according to claim 6, wherein
    the selection unit is configured to select the first control method in a case where the range in which the focal length can be changed is equal to or wider than a preset second predetermined value and the focal length is equal to or shorter than a preset fourth predetermined value, select the second control method in a case where the focal length is longer than a preset fifth predetermined value larger than the fourth predetermined value, and select the third control method in a case where the focal length is longer than the fourth predetermined value and equal to or shorter than the fifth predetermined value.

10. The image stabilization control apparatus according to claim 1, wherein the one or more processors and/or circuitry further function as a notification unit,
    wherein the calculation unit obtains the correction amount of one of the first driver and the second driver based on the shake amount and on the control method selected by the selection unit, and
    wherein the notification unit notifies a unit for obtaining a correction amount of the other of the first driver and the second driver of the control method selected by the selection unit.

11. The image stabilization control apparatus according to claim 1, wherein the calculation unit obtains respective correction amounts of the first driver and the second driver based on the shake amount and on the control method selected by the selection unit.

12. The image stabilization control apparatus according to claim 1, wherein
    the second control method controls a ratio between the shake amount to be corrected by the first driver and the shake amount to be corrected by the second driver.

13. The image stabilization control apparatus according to claim 12, wherein
    the first control method controls the ratio.

14. The image stabilization control apparatus according to claim 1, wherein
the inverse-conversion is performed so as to cancel out an amount that has been over-corrected in the over-correction.

15. An image stabilization control method for performing image stabilization by controlling a first driver and a second driver, the first driver correcting camera shake by driving a correction lens included in an imaging optical system in a direction perpendicular to an optical axis, the second driver correcting camera shake by driving an image sensor in a direction perpendicular to the optical axis, the image sensor photoelectrically converting light incident via the imaging optical system and outputting an image signal, the image stabilization control method comprising:
obtaining a shake amount from a detection unit;
selecting, based on a current focal length of the imaging optical system, one of a plurality of control methods including a first control method and a second control method that is different from the first control method; and
obtaining a correction amount of at least one of the first driver and the second driver based on the shake amount and on the control method selected in the selecting,
wherein the first control method is a method which performs an over-correction using the first driver in which a correction is made in excess of the shake amount within a range in which the first driver can be driven, and which also performs an inverse-correction using the second driver.

16. A non-transitory computer-readable storage medium, the storage medium storing a program that is executable by the computer, wherein the program includes program code for causing the computer to function as an image stabilization control apparatus that performs image stabilization by controlling a first driver and a second driver, the first driver correcting camera shake by driving a correction lens included in an imaging optical system in a direction perpendicular to an optical axis, the second driver correcting camera shake by driving an image sensor in a direction perpendicular to the optical axis, the image sensor photoelectrically converting light incident via the imaging optical system and outputting an image signal, the image stabilization control apparatus comprising:
an obtainment unit that obtains a shake amount from a detection unit;
a selection unit that selects, based on a current focal length of the imaging optical system, one of a plurality of control methods including a first control method and a second control method that is different from the first control method; and
a calculation unit that obtains a correction amount of at least one of the first driver and the second driver based on the shake amount and on the control method selected by the selection unit,
wherein the first control method is a method which performs an over-correction using the first driver in which a correction is made in excess of the shake amount within a range in which the first driver can be driven, and which also performs an inverse-correction using the second driver.

17. A camera comprising:
an image sensor that photoelectrically converts light incident via an imaging optical system and outputting an image signal;
a second driver that corrects camera shake by driving the image sensor in a direction perpendicular to an optical axis of the imaging optical system; and
one or more processors and/or circuitry which function as:
an obtainment unit that obtains a shake amount from a detection unit;
a selection unit that selects, based on a current focal length of the imaging optical system, one of a plurality of control methods including a first control method and a second control method that is different from the first control method; and
a calculation unit that obtains a correction amount of at least one of a first driver that corrects camera shake by driving a correction lens included in the imaging optical system in a direction perpendicular to the optical axis and the second driver based on the shake amount and on the control method selected by the selection unit,
wherein the first control method is a method which performs an over-correction using the first driver in which a correction is made in excess of the shake amount within a range in which the first driver can be driven, and which also performs an inverse-correction using the second driver.

18. A lens apparatus comprising:
an imaging optical system;
a first driver that corrects camera shake by driving a correction lens included in the imaging optical system in a direction perpendicular to an optical axis; and
one or more processors and/or circuitry which function as:
an obtainment unit that obtains a shake amount from a detection unit;
a selection unit that selects, based on a current focal length of the imaging optical system, one of a plurality of control methods including a first control method and a second control method that is different from the first control method; and
a calculation unit that obtains a correction amount of at least one of the first driver and a second driver correcting camera shake by driving an image sensor in a direction perpendicular to the optical axis, the image sensor photoelectrically converting light incident via the imaging optical system and outputting an image signal based on the shake amount and on the control method selected by the selection unit,
wherein the first control method is a method which performs an over-correction using the first driver in which a correction is made in excess of the shake amount within a range in which the first driver can be driven, and which also performs an inverse-correction using the second driver.

* * * * *